(12) United States Patent
Baker

(10) Patent No.: US 10,157,545 B1
(45) Date of Patent: Dec. 18, 2018

(54) FLIGHT NAVIGATION USING LENTICULAR ARRAY

(71) Applicant: Amazon Technologies, Inc., Seattle, WA (US)

(72) Inventor: Patrick Terry Baker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 434 days.

(21) Appl. No.: 14/578,580

(22) Filed: Dec. 22, 2014

(51) Int. Cl.
G08G 5/00 (2006.01)
B64F 1/20 (2006.01)
B64F 1/18 (2006.01)
B64D 47/08 (2006.01)
B64D 45/08 (2006.01)

(52) U.S. Cl.
CPC ............ *G08G 5/006* (2013.01); *B64F 1/18* (2013.01); *B64F 1/20* (2013.01); *G08G 5/0069* (2013.01); *B64D 45/08* (2013.01); *B64D 47/08* (2013.01)

(58) Field of Classification Search
CPC ........ G08G 5/006; G08G 5/0069; B64F 1/18; B64F 1/20; B64D 47/08; B64D 45/04; B64D 45/08
See application file for complete search history.

(56) References Cited

U.S. PATENT DOCUMENTS

| 3,843,263 | A | * | 10/1974 | Snead | B64F 1/007 114/261 |
|---|---|---|---|---|---|
| 3,885,876 | A | * | 5/1975 | Konopka | G01S 1/70 340/955 |
| 4,667,196 | A | * | 5/1987 | Kaul | G01S 13/787 340/948 |
| 2011/0069892 | A1 | * | 3/2011 | Tsai | G06K 9/3241 382/218 |
| 2011/0122635 | A1 | * | 5/2011 | Calvin | B64D 47/06 362/470 |
| 2012/0078451 | A1 | * | 3/2012 | Ohtomo | B64C 39/024 701/15 |
| 2014/0018979 | A1 | * | 1/2014 | Goossen | G08G 5/0034 701/3 |
| 2014/0032034 | A1 | * | 1/2014 | Raptopoulos | G08G 5/0069 701/25 |
| 2015/0142213 | A1 | * | 5/2015 | Wang | B64C 19/00 701/2 |

(Continued)

*Primary Examiner* — Jelani A Smith
*Assistant Examiner* — Donald J Wallace
(74) *Attorney, Agent, or Firm* — Thomas | Horstemeyer, LLP

(57) ABSTRACT

Disclosed are various embodiments for flight guidance of an aircraft or other aerial vehicle using one or more lenticular arrays. An aircraft control application may be employed to determine whether a location of an aircraft is within a predefined distance of a lenticular array that defines an optimal flight corridor. If the aircraft is at a location within the predefined distance, the aircraft control application may attempt to visually locate the lenticular array using an imaging device. A position of the aircraft relative to the optimal flight corridor may be determined based at least in part on a visual identifier identified in a digital image of the lenticular array. A flight of the aircraft may be controlled to follow a flight path falling within the optimal flight corridor based at least in part on the visual identifier.

20 Claims, 10 Drawing Sheets

(56) References Cited

U.S. PATENT DOCUMENTS

2016/0048716 A1* 2/2016 Spaulding ............ G06K 7/1439
235/462.12
2016/0122038 A1* 5/2016 Fleischman ............... B64F 1/20
701/2

* cited by examiner

US 10,157,545 B1

FLIGHT NAVIGATION USING LENTICULAR ARRAY

BACKGROUND

The use of various types of aircrafts and aerial vehicles is increasing. For example, aerial vehicles are now being used to perform aerial imaging and to deliver goods and packages.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to flight guidance of an aircraft or other aerial vehicle using one or more lenticular arrays. As the use of various types of aircrafts and aerial vehicles is increasing in urban and remote environments, the difficulty in performing automated flight navigation is increasing in complexity. For example, aerial vehicles may be used to perform aerial imaging and to deliver goods or packages. The performance of automated landings to deliver packages to locations such as single-unit residences, apartment buildings, and materials handling centers presents its own unique set of difficulties and challenges. For example, it may be difficult for an aircraft to land in certain urban environments without colliding with overhead electrical lines, navigating trees, violating protected airspace, etc. Moreover, having remote pilots perform manual landings is expensive and requires substantial infrastructure.

A lenticular array is an array of lenses arranged so that different visual identifiers are viewable from different angles. Visual identifiers may comprise, for example, colors, color gradients, textures, texture gradients, patterns, and/or images. Lenticular arrays are capable of inexpensive production and can be replaced at minimal costs. A lenticular array may be configured to form a range of viewing angles where different visual identifiers, such as colors, textures, or images, are shown as the viewing angle changes.

According to various embodiments as described herein, an aircraft control application may be executed by a computing device to determine whether a location of an aircraft is within a predefined distance of a lenticular array that defines a specific flight path and/or an optimal flight corridor. If the aircraft is at a location within the predefined distance, the aircraft control application may attempt to visually locate the lenticular array using an imaging device, such as a digital camera. Assuming the lenticular array is located or is otherwise capable of visual inspection by the imaging device, one or more digital images of the lenticular array may be captured and processed to identify one or more visual identifiers (e.g., colors, images, or textures) in a region of the lenticular array. A position of the aircraft relative to the clear flight corridor may be determined based at least in part on at least one color identified in a digital image of the lenticular array. A flight of the aircraft may be controlled to follow a flight path falling within the clear flight corridor based at least in part on the at least one color, or a particular texture configuration, defined by an amplitude, phase, or wavelength offset. In various embodiments, the flight path may comprise a landing approach of the aircraft. In the following discussion, a general description of the system and its components is provided, followed by a discussion of the operation of the same.

Figure 1:
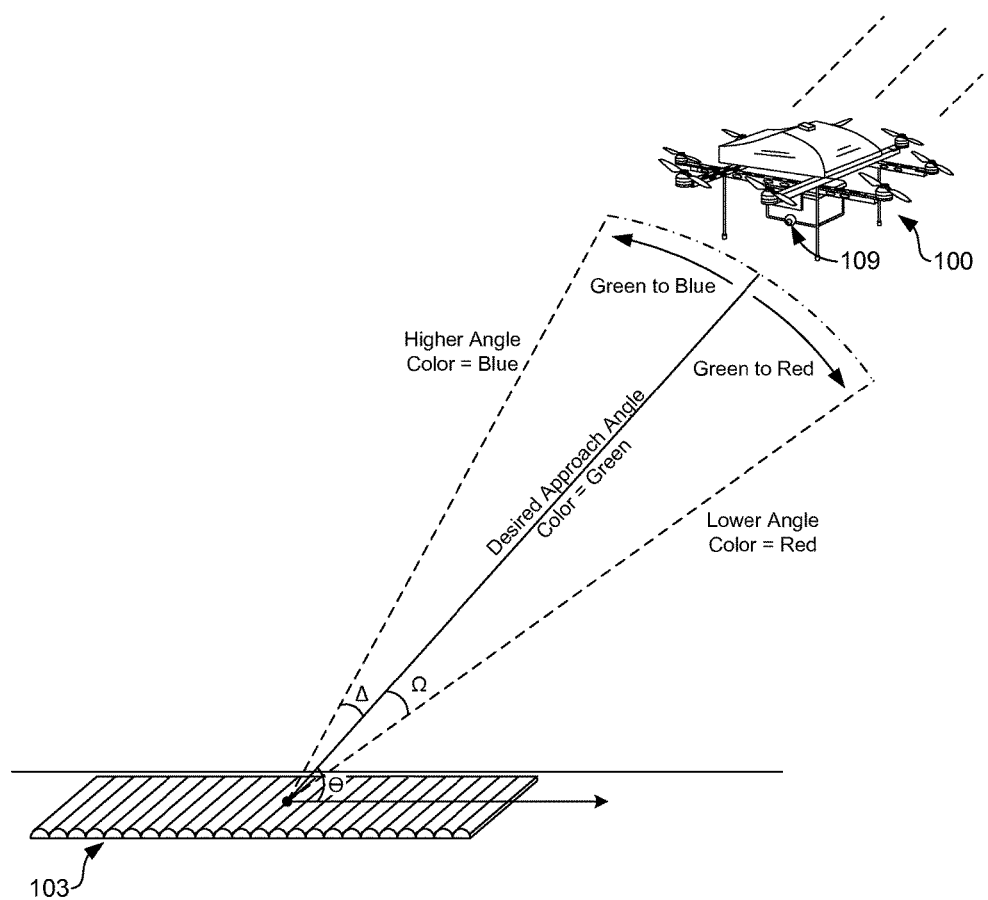
FIG. 1 is a drawing of an aircraft using a lenticular array for flight guidance according to various embodiments of the present disclosure.

With reference to FIG. 1, shown is a non-limiting example of an aircraft 100 navigating a flight path using a lenticular array 103 that defines a specific flight path and/or a clear flight corridor according to various embodiments of the present disclosure. According to various embodiments, an aircraft 100 may comprise a land-based aircraft, a seaplane, an amphibian aircraft, a helicopter, a dirigible (also referred to as an airship), a gyrocopter, a tilt-wing aircraft, a glider, a sailplane, or any other type of aircraft 100. For embodiments in which the aircraft 100 is a helicopter, the aircraft 100 may comprise a single- or multi-rotor helicopter. The aircraft 100 may comprise a manned, a remotely manned, or an autonomous and unmanned vehicle. In some embodiments, the aircraft 100 may comprise an autonomous vehicle.

As noted above, the lenticular array 103 comprises an array of magnifying lenses arranged so that different colors, textures, or images are viewable from different angles. Angles of view include a range of angles within which one or more imaging devices 109 of the aircraft 100 may see identifiers (e.g., colors, textures, gradients, or images) preconfigured in the lenticular array 103. The lenticular array 103 may be configured such that a first angle of view Δ (Delta) is +5 degrees or more from the desired approach angle. Similarly, the lenticular array 103 may be configured such that a second angle of view Ω (Omega) is −5 degrees or less from the desired approach angle. As can be appreciated, an angle of view 106 for a given color is based on a maximum angle at which a ray associated with the given color can leave the lenticular array 103 through a lenticule.

As a non-limiting example, a lenticular array 103 may be customized such that a desired approach angle for an aircraft 100 at a given time or location is a predefined angle θ (Theta). To this end, when the lenticular array 103 is viewed at the angle θ by the imaging device 109 of the aircraft 100, the imaging device 109 may perceive a first color (e.g., green) from the lenticular array 103. Assuming the aircraft 100 is noticeably above the predefined angle θ, the imaging device 109 on the aircraft 100 may perceive a second color (e.g., blue) from the lenticular array 103. Alternatively, assuming the aircraft 100 is noticeably below the predefined angle θ, the imaging device 109 on the aircraft 100 may perceive a third color (e.g., red) from the lenticular array 103. Thus, the lenticular array 103 may be described as generating an optimal or a clear flight corridor comprising a predefined range of acceptable angles for a flight path of an aircraft 100 to assume in at least two dimensions (e.g., up and down, left and right).

For purposes of illustration herein, green may be used to describe a correct approach angle or a correct range of approach angles, while blue and red may be used to describe approach angles above or below the range of approach angles. Although green, blue, and red are discussed, the disclosure is not limited to these colors. For example, other colors may be used in the lenticular array 103 that are indicative of a corrective action needed to be performed to control a flight of the aircraft to follow a flight path falling within the clear flight corridor. Similarly, the predefined angle θ may be defined at any angle based on the terrain and/or the ideal flight path. Further, texture descriptors of various kinds may be used to ascertain the angle of approach. For instance, one can apply signal processing filters such as Gabor filters to find relative phase and wavelength of a texture with respect to another texture on the target.

An aircraft control application may be executed by at least one computing device to access and analyze a digital image or a video feed captured by the imaging device 109. To this end, the aircraft control application may be employed to identify the colors, or range of colors, perceived by the imaging device 109 at a current angle of the aircraft 100. Similarly, the aircraft control application may be employed to identify a deviation of the aircraft 100 from a flight path defined by the lenticular array 103. For example, the aircraft control application may observe the green, the blue, and/or the red colors from the lenticular array 103. The aircraft control application may apply a corrective action if the aircraft 100 is outside of the flight path, for example, when the aircraft 100 is above or below the desired approach angle. Assuming a color observed from the lenticular array 103 is red (or any other color indicating that the aircraft 100 is below the desired approach angle), then the aircraft control application may cause the aircraft 100 to adjust its flight path to fall within the clear flight corridor, for example, by increasing its approach angle. Similarly, assuming a color observed from the lenticular array 103 is blue (or any other color indicating that the aircraft 100 is below the desired approach angle), then the aircraft control application may cause the aircraft 100 to adjust its flight path to fall within the clear flight corridor, for example, by decreasing its approach angle. If a color observed from the lenticular array 103 is green, the aircraft control application may cause the aircraft 100 to maintain its flight path within the clear flight corridor by neither increasing nor decreasing the approach angle. In other embodiments, color gradients and/or texture gradients may be employed in the lenticular array 103 such that an identifier (e.g., a color or a texture) observed from the lenticular array 103 causes the aircraft 100 to adjust or maintain its flight path within a flight corridor.

According to various embodiments, the imaging device 109 may comprise a digital imaging device, such as a digital camera, and may be configured to generate one or more digital images. The digital image may comprise a data file with visual information observable by the aircraft control application. According to various embodiments, the digital image may be compressed according to an image file format, such as Joint Photographic Experts Group (JPEG), graphic interchange format (GIF), portable networks graphic (PNG), bitmap (BMP), raw image format (RIF), tagged image file format (TIFF), or any other suitable image file format. The digital image may be processed by the aircraft control application to identify a region in the digital image corresponding to a lenticular array 103. Colors within the region may be identified, for example, using hexadecimal values or other identifying information. Textures may be identified with digital signal processing filters of various kinds, for example Gabor filters, Fourier transforms, or wavelets.

In some embodiments, the imaging device 109 may be configured to generate one or more video files or video feeds. A video file or feed may comprise a data file with one or more frames of visual content observable by the aircraft control application. According to various embodiments, the video file may be compressed and/or generated according to a video file format, such as flash video (FLV), audio video interleave (AVI), windows media video (WMV), moving picture experts group (MPEG), or any other suitable video file format. A video file may be processed by the aircraft control application to identify a region in one or more frames of the video file corresponding to a lenticular array 103. Colors within the region may be identified, for example, using hexadecimal values or other identifying information. Textures may be identified with digital signal processing filters of various kinds, for example Gabor filters, Fourier transforms, or wavelets.

Figure 2:
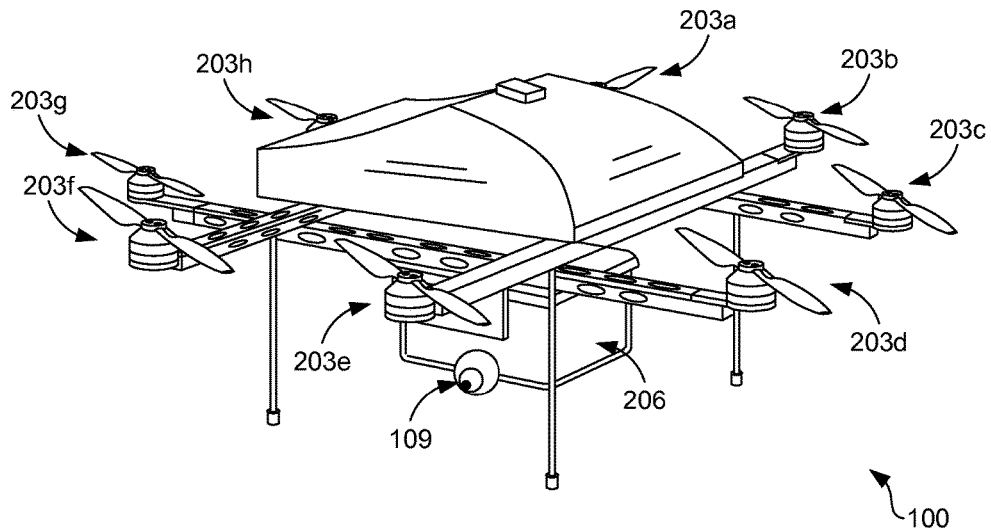
FIG. 2 is a drawing of a multi-rotor helicopter aircraft according to various embodiments of the present disclosure.

Moving on to FIG. 2, shown is a drawing of an aircraft 100 according to various embodiments of the present disclosure. In the non-limiting example of FIG. 2, the aircraft 100 comprises a multi-rotor helicopter. A multi-rotor helicopter may comprise a plurality of rotors 203a . . . 203h (collectively rotors 203) configured to provide lift for the aircraft 100. By varying the relative speed of the rotors 203, six degrees of freedom (6DoF) of the aircraft 100 may be controlled during its flight path and may be altered based on the thrust and torque produced by each of the rotors 203. For example, by varying the relative speed of individual ones of the rotors 203, a pitch, roll, and yaw of the aircraft 100 may be controlled as well as moving the aircraft 100 up, down, left, right, forwards, and backwards.

In various embodiments, the aircraft 100 may comprise a cargo area 206 configured to carry items such as packages, materials, etc. An aircraft control application may account for any additional weight in the cargo area 206, as can be appreciated. Further, in some embodiments, the aircraft 100 may include an on-board imaging device 109. As noted above, the imaging device 109 may comprise a digital camera. In various embodiments, the digital camera may comprise various types of lenses such as a process lens, an apochromatic lens, a stereoscopic lens, a fish eye lens, a soft focus lens, an infrared lens, a swivel lens, a shift lens, or any combination thereof.

In various embodiments, the imaging device 109 is fixed at a location of the aircraft 100. However, in some embodiments, the imaging device 109 may be capable of movement independent from the aircraft 100. To this end, the imaging device 109 may comprise a pan-tilt-zoom (PTZ) camera or any other camera capable of moving in multiple directions. In various embodiments, the aircraft control application or an imaging device control application may be configured to cause a change in direction of the imaging device 109. For example, the aircraft control application may cause the imaging device 109 to move left, right, up or down, or the aircraft control application may cause the imaging device 109 to zoom in or out. In various embodiments, the aircraft control application may employ the imaging device 109 to attempt visual identification and/or location of a lenticular array 103 (FIG. 1) as will be described herein. Additionally, given a fixed location of the imaging device 109 on the aircraft 100, a pose of the aircraft 100 may be calculated by employing known geometrical calculations.

Figure 3:
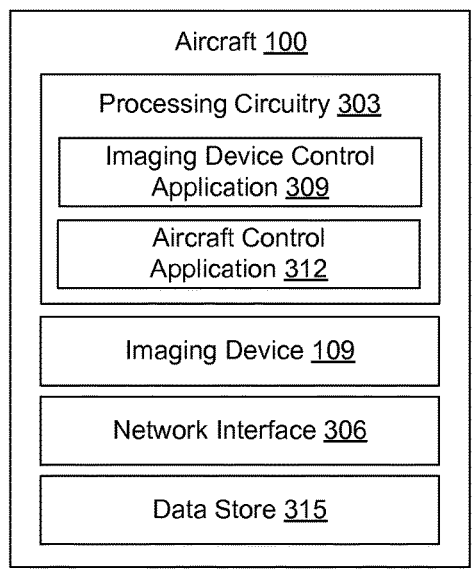
FIG. 3 is a schematic block diagram that provides one example illustration of the components of the aircraft of FIG. 1 according to various embodiments of the present disclosure.

Referring next to FIG. 3, shown is a schematic block diagram illustrating a portion of the components of an aircraft 100 according to various embodiments. In the non-limiting example of FIG. 3, the aircraft 100 may comprise processing circuitry 303, an imaging device 109, and a network interface 306.

In various embodiments, the processing circuitry 303 may be configured to execute one or more applications such as an imaging device control application 309 and an aircraft control application 312. In alternative embodiments, the functions of the imaging device control application 309 and the aircraft control application 312 may be performed by logic gates, application specific integrated circuits (ASICs) having appropriate logic gates, field-programmable gate arrays (FPGAs), or other components, etc. In various embodiments, the processing circuitry 303 comprises a microcontroller and/or hardware processor.

The imaging device control application 309 may be executed by the processing circuitry 303 to perform control operations associated with the imaging device 109. For example, the imaging device control application 309 may control the capture of digital images, audio, video, or other content by employing the imaging device 109. In embodiments where the imaging device 109 is capable of movement independent from the aircraft 100, the imaging device control application 309 may control the movement of the imaging device 109. For example, the imaging device control application 309 may send a signal to the imaging device 109 (or related components) to cause the imaging device 109 to move left, right, up, or down. Further, the imaging device control application 309 may send signals to calibrate the imaging device 109, modify capture settings (e.g., resolution, brightness, intensity, shutter speed, etc.), capture digital images, capture video, zoom in, zoom out, etc.

The aircraft control application 312 may be executed by the processing circuitry 303 to perform control operations associated with the aircraft 100. For example, the aircraft control application 312 may adjust a speed of one or more rotors 203 (FIG. 2) of the aircraft 100 to adjust a pose of the aircraft 100 according to six degrees of freedoms. To accomplish a change in pose, the aircraft control application 312 may vary the relative speed of one or more of the rotors 203 to adjust a pitch, roll, and yaw of the aircraft 100. Additionally, the aircraft control application 312 may vary the relative speed of the rotors 203 to move the aircraft 100 up, down, left, right, forwards, and backwards.

In various embodiments, the aircraft control application 312 may be executed by the processing circuitry 303 to determine whether a location of the aircraft 100 is within a predefined distance of a lenticular array 103 (FIG. 1). For example, the processing circuitry 303 may compare a location of the aircraft 100 relative to predefined locations of lenticular arrays 103 stored, for example, in local memory. In response to the aircraft 100 being within the predefined distance, the aircraft control application 312 may attempt to visually locate the lenticular array 103 using the imaging device 109. Assuming the lenticular array 103 is located or capable of visual inspection by the imaging device 109, the aircraft control application 312 may communicate with the imaging device control application 309 to perform a capture of digital images of the lenticular array 103. The digital images may be stored in a data store 315, a buffer, or other memory to await further processing by the aircraft control application 312.

Subsequently, the aircraft control application 312 may process the digital images to identify one or more colors associated with lenticular array 103. The one or more colors may be used to determine an approach angle of the aircraft 100 or to guide the aircraft 100 through a clear flight corridor for landing or other flight maneuvers. To this end, the colors or textures detected in the lenticular array 103 can be employed by the aircraft control application 312 to cause the aircraft 100 to follow a flight path falling within the clear flight corridor.

In various embodiments, the processing circuitry 303 on the aircraft 100 may be minimal or may be limited in capability. As a result, the network interface 306 may be employed in communicating information captured by the imaging device 109 to remote computing devices for processing. In various embodiments, the network interface 306 may comprise a near field network interface such as a Bluetooth®, ZigBee®, or near field communication (NFC) module. In alternative embodiments, the network interface 306 may comprise a global positioning system (GPS) module, a wireless fidelity (Wi-Fi) module, a global system for mobile communication (GSM) module, a code division multiple access (CDMA) module, etc. A receiver may communicate with the network interface 306, communicate the information to a remote computing device for processing, and return any information from the remote computing device, if necessary.

Accordingly, in various embodiments, all or a portion of the functions performed by the aircraft control application 312 may be performed by a remote computing device by communicating data and/or receiving instructions from the remote computing device. For example, the remote computing device may use a GPS module of the aircraft 100 to determine whether a location of the aircraft 100 is within a predefined distance of a lenticular array 103 within a coordinate system. In various embodiments, the location determined by the GPS module of the aircraft 100 may include latitude, longitude, and/or altitude relative to the World Geodetic System (WGS) ellipsoid (e.g., WGS-84). In other embodiments, global system for mobile communication (GSM) or code-division multiple access (CDMA) modules may be employed to determine a position of the aircraft 100 in a coordinate system relative to one or more lenticular arrays 103. To this end, a GSM module or CDMA module may utilize cellular tower triangulation, or other similar technologies, to identify a location of the aircraft 100. In various embodiments, local beacon transmitters set at various locations may be used to determine a location of the aircraft 100 in a coordinate system. Other location modules and coordination systems may be employed.

In response to the aircraft 100 being within the predefined distance, the remote computing device may attempt to visually locate the lenticular array 103 by remotely instructing the imaging device control application 309 to perform various movements of the imaging device 109 (e.g., pan left, pan right, zoom in, zoom out, etc.).

If the lenticular array 103 is located by the imaging device 109, the remote computing device may cause the imaging device 109 to capture digital images of the lenticular array 103. Further, the remote computing device may process the digital images to identify at least one color or texture associated with lenticular array 103. The one or more colors or textures may be used to determine a position or a pose of the aircraft 100 in three-dimensional space relative to a clear flight corridor. To this end, the colors or textures detected in the lenticular array 103 may be employed by the remote computing device to cause the aircraft to follow a flight path falling within the clear flight corridor based on the detected colors.

In some embodiments, the remote computing device may comprise, for example, a server computer or any other system providing computing capability. Alternatively, the remote computing device may employ a plurality of computing devices that may be arranged, for example, in one or more server banks or computer banks or other arrangements. Such computing devices may be located in a single installation or may be distributed among many different geographical locations. For example, the remote computing device may include a plurality of computing devices that together may comprise a hosted computing resource, a grid computing resource, and/or any other distributed computing arrangement. In some cases, the remote computing device may correspond to an elastic computing resource where the allotted capacity of processing, network, storage, or other computing-related resources may vary over time.

Figure 4:
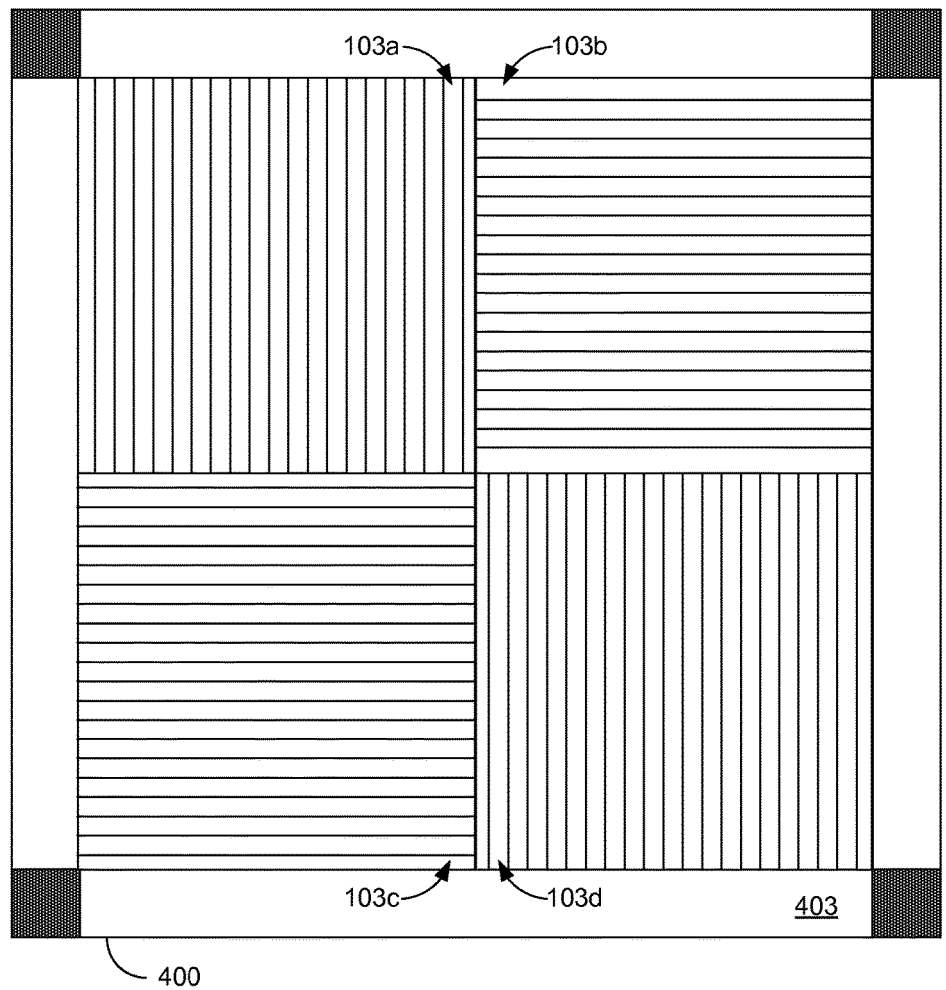
FIG. 4 is a drawing of an arrangement of lenticular arrays according to various embodiments of the present disclosure.

Turning now to FIG. 4, shown is a drawing of a lenticular array collection 400 which may comprise an arrangement of a plurality of lenticular arrays 103a . . . 103d (collectively lenticular arrays 103). In the non-limiting example of FIG. 4, the lenticular array collection 400 comprises four lenticular arrays 103, wherein a first one of the lenticular arrays 103a and a second one of the lenticular arrays 103d have a first orientation, while a third one of the lenticular arrays 103b and a fourth one of the lenticular arrays 103c have a second orientation. The differentiating orientations may be used by the aircraft control application 312 (FIG. 3) in distinguishing one lenticular array 103 from another, as can be appreciated. The lenticular array collection 400 may comprise a border having a color that is distinguishable from the surrounding area or terrain. Using visual processing, the aircraft control application 312 may be configured to identify the lenticular array collection 400, or one or more of the lenticular arrays 103 in the lenticular array collection 400, from the surrounding terrain.

In various embodiments, the aircraft control application 312 may use at least one digital image of the lenticular array collection 400 to determine whether the aircraft 100 is following a flight path falling within a clear flight corridor. For example, the first one of the lenticular arrays 103a and the second one of the lenticular arrays 103d may be used to determine whether the aircraft 100 is above or below a desired approach angle while the third one of the lenticular arrays 103b and the fourth one of the lenticular arrays 103c may be used to determine whether the aircraft 100 is too far to the left of the clear flight corridor or too far to the right of the clear flight corridor. As a result, the aircraft 100 may determine at least two approach angles with a single arrangement of lenticular arrays 103.

Accordingly, each of the lenticular arrays 103 in the lenticular array collection 400 may be preconfigured with visual identifiers (e.g., colors, textures, or images) that, when captured by the imaging device 109 (FIG. 1), are indicative of whether corrective action is required with respect to the flight path. To correct the aircraft 100 to the desired approach angle, the aircraft 100 may adjust its pitch, roll, yaw, etc. For example, a blue or red color in the third one of the lenticular arrays 103b and the fourth one of the lenticular arrays 103c may be indicative that a corrective action is needed to move the aircraft 100 to the left or to the right to fall within the clear flight corridor, while a green color may be indicative that the aircraft 100 is within the clear flight corridor. Thus, when viewed at a certain angle, a color of each of the lenticular arrays 103 may be indicative of any corrections that may need to occur in the flight path of the aircraft 100.

Although the non-limiting example of FIG. 4 shows the first one of the lenticular arrays 103a and the second one of the lenticular arrays 103d being used determine whether the aircraft 100 is above or below a desired approach angle, while the third one of the lenticular arrays 103b and the fourth one of the lenticular arrays 103c are used to determine whether the aircraft 100 is too far to the left of the desired approach or too far right of the optimal flight corridor, the present disclosure is not so limited. In various embodiments, the lenticular array collection 400 may comprise two or more lenticular arrays 103 in various orientations, wherein each of the lenticular arrays 103 is capable of facilitating a navigation of the aircraft 100 relative to an ideal flight path or landing.

In various embodiments, a backing may be printed on or otherwise attached to one or more lenticular arrays 103 that causes the one or more lenticular arrays 103 to show a particular visual identifier at various angles. In various embodiments, the backing may comprise a liquid crystal display (LCD), a light emitting diode (LED) display, or another similar display, to facilitate a dynamic changing of the visual identifiers located on the backing of the lenticular arrays 103. As a non-limiting example, a lenticular array 103 with a LCD display backing may be configured to show a first range of colors while a first aircraft 100 navigates to the lenticular array 103 to route the first aircraft 100 in a first direction. After guiding the aircraft 100 to the first direction, the LCD display backing may display a second range of colors while a second aircraft 100 navigates to the lenticular array 103 to route the second aircraft 100 in a different direction than the first aircraft 100.

Figure 5:
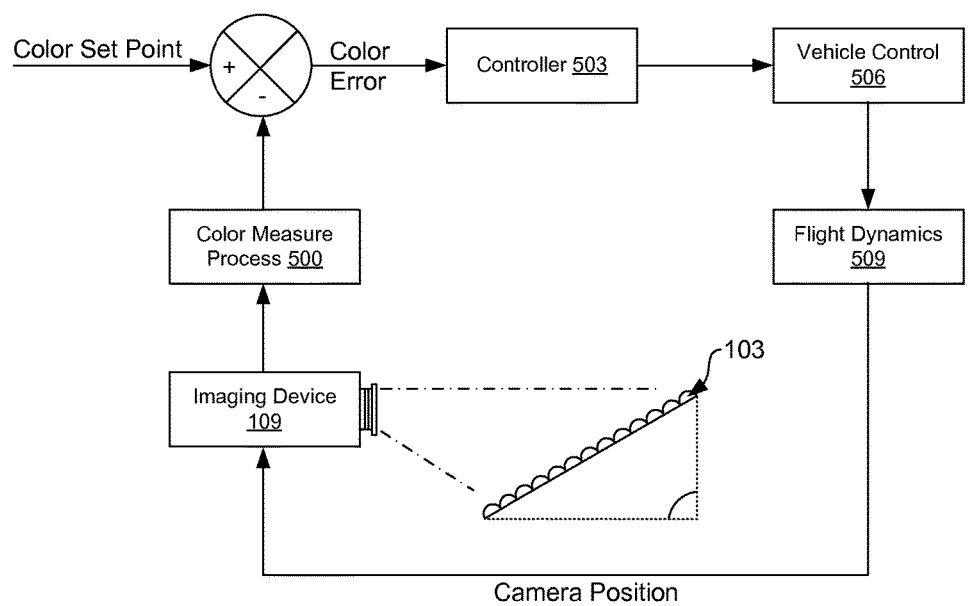
FIG. 5 is a schematic block diagram that provides one example illustration of the components of the aircraft of FIG. 1 according to various embodiments of the present disclosure.

Referring next to FIG. 5, shown is a schematic block diagram that provides one example illustration of the components of an aircraft 100 (FIG. 1) according to various embodiments of the present disclosure. To begin, a color set point may be used to associate particular colors (or thresholds of colors) with indications of a flight path of an aircraft 100. To continue the example of FIG. 1, a lenticular array 103 may be customized such that a desired approach angle for an aircraft 100 at a given time or location is a predefined angle θ, such as 45 degrees. To this end, when viewed at a 45 degree angle by the imaging device 109 of the aircraft 100, the imaging device 109 may perceive a green color from the lenticular array 103. Assuming the aircraft is noticeably above the 45 degree angle at, for example, 50 degrees, the imaging device 109 on the aircraft 100 may perceive a blue color from the lenticular array 103. Alternatively, assuming the aircraft 100 is noticeably below the 45 degree angle at, for example, 33 degrees, the imaging device 109 on the aircraft 100 may perceive a red color from the lenticular array 103.

Accordingly, the color set point may predefine that a perception of a green color from a lenticular array 103 during a color measure process 500 is indicative of the flight path of the aircraft 100 being within the optimal flight corridor, while detection of a red or blue color during a color measure process 500 from the lenticular array 103 is indicative of the flight path of the aircraft 100 being outside of the optimal flight corridor. Using the color set point, the aircraft 100 has context of what colors are indicative of which characteristics of the flight path.

When a color is detected within a color error threshold, a controller 503 of the aircraft 100 may relate the color identified by the color measure process 500 to a task needed to be performed by the aircraft 100 with respect to its flight path. For example, the color measure process 500 may observe a green, blue, or red color from the lenticular array 103. The controller 503 may associate the green, blue, or red color with a corrective action needed to be performed by a vehicle control 506, if necessary. For example, the controller 503 may communicate the corrective action to the vehicle control 506 if the aircraft 100 is above or below the desired approach angle. Assuming a color observed from the lenticular array 103 is red (or any other color indicating that the aircraft 100 is below the desired approach angle), then the vehicle control 506 may adjust flight dynamics 509 of the aircraft 100 to cause the aircraft 100 to increase its approach angle. Similarly, assuming a color observed from the lenticular array 103 is blue (or any other color indicating that the aircraft 100 is below the desired approach angle), then the vehicle control 506 may adjust the flight dynamics 509 of the aircraft 100 to cause the aircraft 100 to decrease its approach angle. If a color observed from the lenticular array 103 is green, the vehicle control 506 may refrain from adjusting the flight dynamics 509 or the vehicle control 506 may cause the aircraft 100 to maintain its approach angle.

Figure 6A:
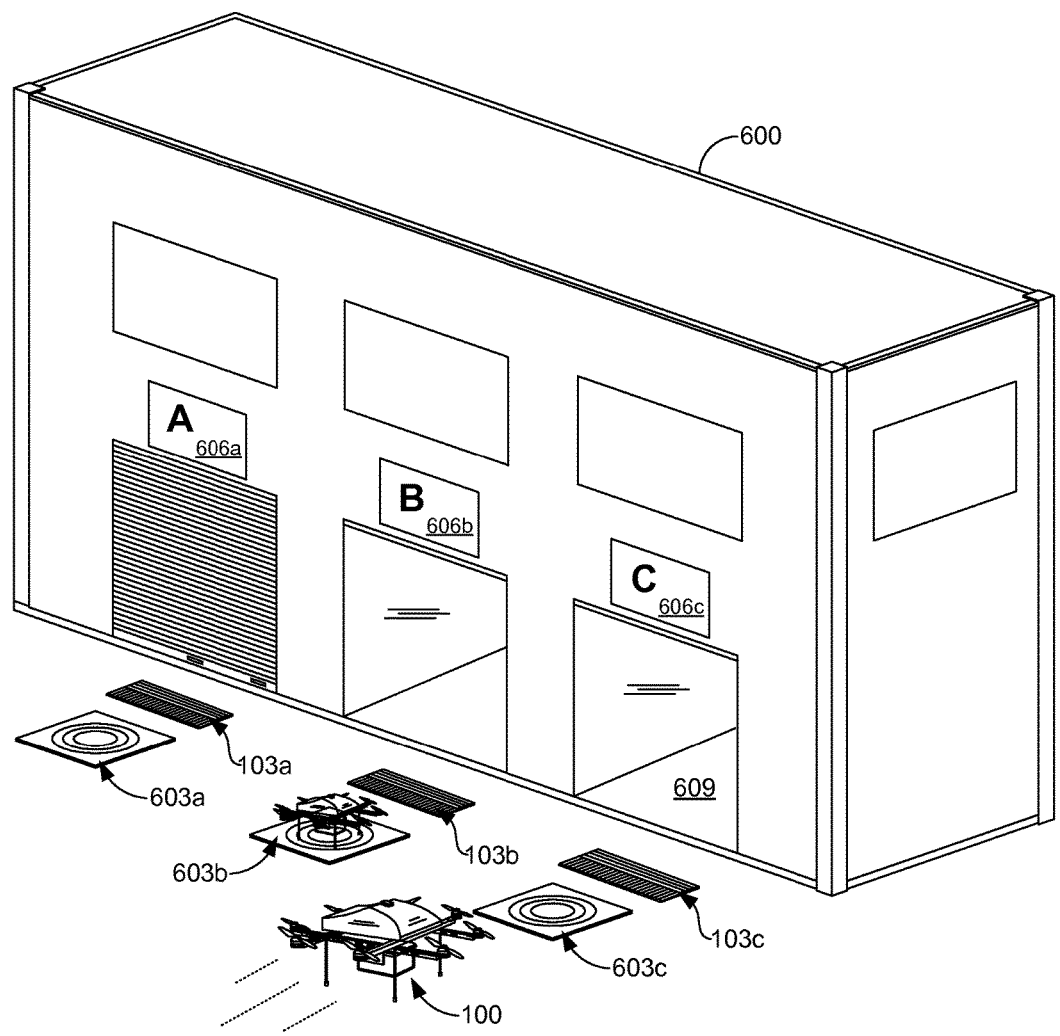
FIGS. 6A-6B are drawings of the aircraft of FIG. 1 navigating a plurality of lenticular arrays according to various embodiments of the present disclosure.

Referring next to FIG. 6A, shown is a drawing of an aircraft 100 configured to navigate a plurality of lenticular arrays 103a . . . 103c in association with a structure 600 according to various embodiments of the present disclosure. The structure 600 may include, but is not limited to, a materials handing center, a warehouse, residential building, commercial building, distribution center, cross-docking facility, order fulfillment center (also referred to as a fulfillment facility), packaging facility, shipping facility, distribution truck, cargo ship, or other facility or combination of facilities.

The aircraft 100 may be configured to perform a landing at one of a plurality of landing locations 603 . . . 603c (collectively landing locations 603) associated with the structure 600. To accomplish a landing at the one of the landing locations 603, the aircraft 100 may use one or more identifiers 606a . . . 606c (collectively identifiers 606) beyond the lenticular arrays 103 to identify a particular one of the lenticular arrays 103 for navigation or landing. For example, the imaging device 109 (FIG. 1) of the aircraft 100 may capture one or more digital images of the structure 600 and/or the identifiers 606. The processing circuitry 303 may perform visual processing to correspond the identifiers 606 to a flight manifest associated with the aircraft 100 to filter out irrelevant identifiers 606 and to identify relevant identifiers 606. As noted above, an identifier 606 may comprise, for example, one or more numbers, letters, symbols, images, colors, ranges of colors, fiducials (e.g., bar codes and quick response (QR) codes), or other identifiers.

In some embodiments, the lenticular arrays 103 may be employed to navigate the aircraft 100 into an interior 609 of the structure 600 as opposed to landing platforms outside of the structure 600. The interior 609 of the structure 600 may comprise one or more lenticular arrays 103 that facilitate a navigation of the aircraft 100 to certain areas of the structure 600. In some embodiments, the lenticular arrays 103 may be employed to land the aircraft 100 on a conveyor belt or a similar device, for example, to perform fulfillment-related operations.

In various embodiments, an identifier 606 may comprise, for example, one or more numbers, letters, symbols, images, colors, ranges of colors, bar codes, quick response (QR) codes, or other identifiers. A flight manifest may be stored in the data store 315 (FIG. 3) of the aircraft 100 instructing the aircraft 100 to land at "Gate C" of a structure 600. As the aircraft 100 navigates from a first location to the structure 600, the imaging device 109 may identify the plurality of lenticular arrays 103a . . . 103c, wherein each of the lenticular arrays 103 correspond to at least one of the identifiers 606a . . . 606c (e.g., "Gate A," "Gate B," and "Gate C"). The processing circuitry 303 may associate the third one of the lenticular arrays 103c having the letter "C" with the third of the identifiers 606c to perform a landing at "Gate C," as instructed in the flight manifest. As a result, the aircraft 100 may use the third one of the lenticular arrays 103c corresponding to "Gate C," while ignoring the first one of the lenticular arrays 103a and the second one of the lenticular arrays 103b.

Figure 6B:
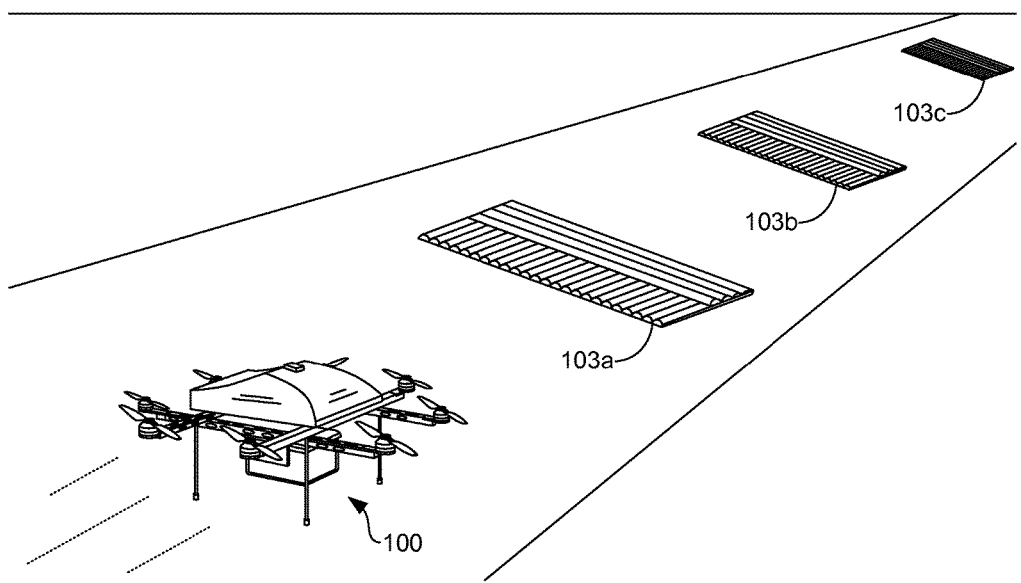

Referring next to FIG. 6B, shown is a drawing of an aircraft 100 configured to navigate through multiple consecutive optimal flight corridors specified by a plurality of lenticular arrays 103a . . . 103c according to various embodiments of the present disclosure. In various embodiments, the aircraft 100 may be configured to perform a first correction of a flight path of the aircraft 100 using a first one of the lenticular arrays 103a. As the aircraft 100 continues on its flight path, the aircraft 100 may be configured to perform subsequent corrections in the flight path of the aircraft 100 using, for example, the second one of the lenticular arrays 103b, the third one of the lenticular arrays 103c, and so on.

As may be appreciated, the aircraft control application 312 is executed to visually locate at least one of the lenticular arrays 103 using the imaging device 109 (FIG. 1) in response to the aircraft 100 being within the predefined distance of the at least one of the lenticular arrays 103. In various embodiments, the lenticular arrays 103 may be positioned on the ground, on sides of buildings (FIG. 6A), on posts, or other structures. A position of the aircraft 100 relative to the optimal flight corridor for each of the lenticular arrays 103 may be based at least in part on at least one color identified in a digital image of the lenticular arrays 103. The flight of the aircraft 100 may be controlled to follow a flight path falling within the optimal flight corridor based at least in part on the at least one color identified in the digital image of the lenticular arrays. When a flight path falls within the optimal flight corridor for a given lenticular array 103, the aircraft 100 may transition to a subsequent lenticular array 103.

Figure 7A:
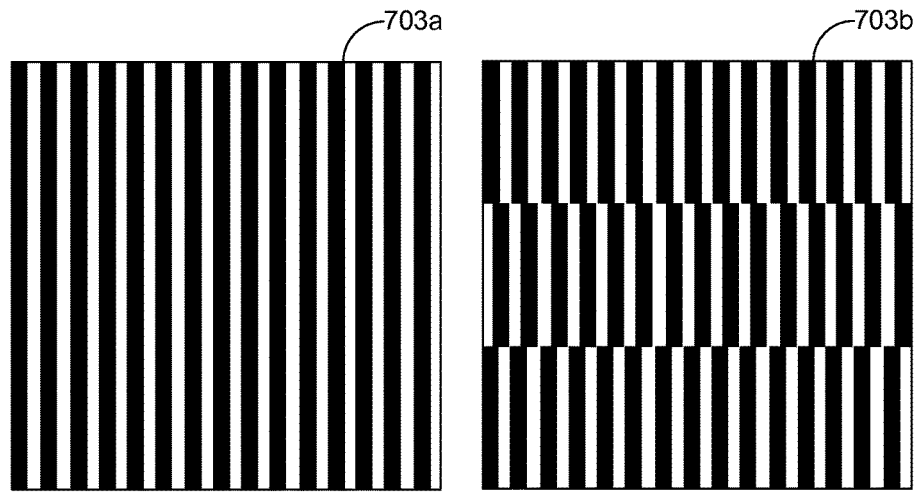
FIGS. 7A-B are drawings of one or more lenticular arrays that illustrate measurable phase shifts according to various embodiments of the present disclosure.
Figure 7B:
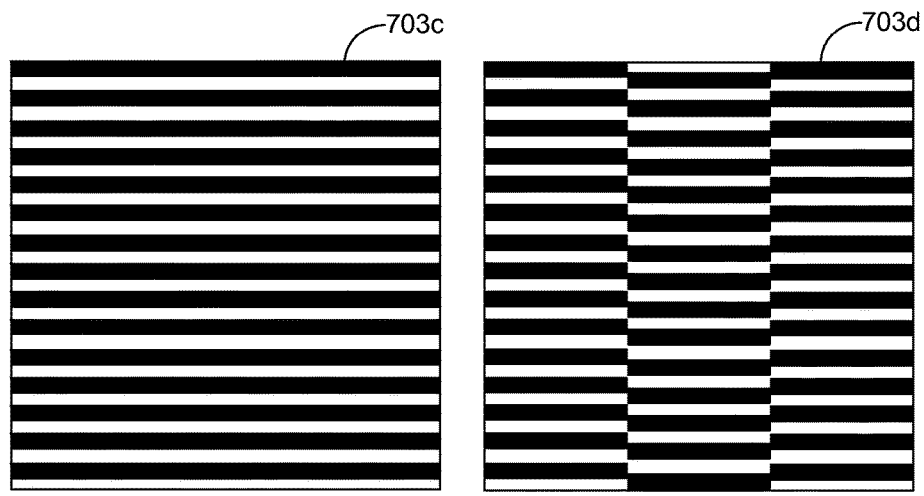

FIGS. 7A-B are drawings of textures 703a . . . 703d (collectively textures 703) that may be seen through a lenticular array 103 (FIG. 1). The textures 703 of FIGS. 7A-B illustrate phase shifts measurable by the processing circuitry 303 (FIG. 3) when the textures 703 are viewed at different angles by the aircraft of FIG. 1 according to various embodiments of the present disclosure. As noted above, various types of textures 703 may be employed to ascertain an angle of approach for an aircraft 100 (FIG. 1). For instance, one can apply digital signal processing filters, such as Gabor filters, Fourier transforms, and/or wavelets, to find a relative phase and a wavelength of a texture 703 with respect to another texture 703 on the target.

As a non-limiting example, an imaging device 109 (FIG. 1) may capture one or more digital images comprising the first one of the textures 703a and the second one of the textures 703b. A difference in the first one of the textures 703a and the second one of the textures 703b may be determined that is indicative of an angle or another position of the aircraft 100. To this end, a digital signal processing may be applied to the digital image that compares the first one of the textures 703a to the second one of the textures 703b. A Gabor filter, Fourier transform, and/or wavelet may be applied to find a relative phase and a wavelength of the second one of the textures 703b with respect to the first one of the textures 703a. In various embodiments, the first one of the textures 703a and the second one of the textures 703b may be located in a same or different lenticular array 103.

Similarly, in FIG. 7B, a digital signal processing may be applied by comparing the third one of the textures 703c to the fourth one of the textures 703d in a same lenticular array 103. A Gabor filter, Fourier transform, and/or wavelet may be applied to find a relative phase and a wavelength of the fourth one of the textures 703 with respect to the third one of the textures 703c.

Figure 8:
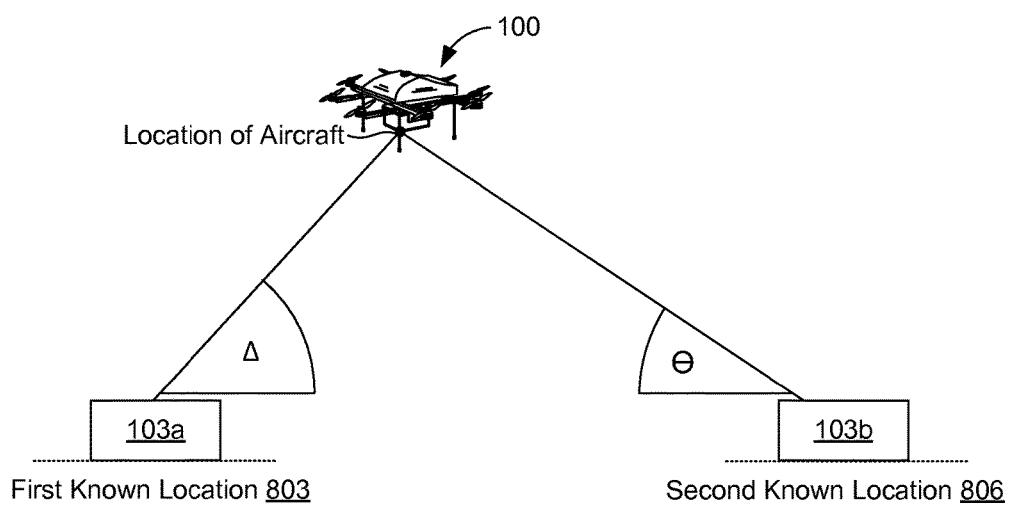
FIG. 8 is a diagram describing location calculations performed by the aircraft of FIG. 1 according to various embodiments of the present disclosure.

FIG. 8 is a diagram describing location calculations that may be performed to determine a location of an aircraft 100 (FIG. 1) according to various embodiments of the present disclosure. In the non-limiting example of FIG. 8, a first lenticular array 103a may be located at a first known location 803 and a second lenticular array 103b may be located at a second known location 806. By processing one or more digital images of the first lenticular array 103a, an angle ($\Omega$) between the first lenticular array 103a and the aircraft 100 may be calculated. Similarly, one or more digital images of the second lenticular array 103b may be used to calculate an angle ($\theta$) between the second lenticular array 103b and the aircraft 100. Given that the locations of the lenticular arrays 103 are known, a location may be calculated for the aircraft 100 using, for example, the angle ($\Omega$) between the first lenticular array 103a and the aircraft 100 and the angle ($\theta$) between the second lenticular array 103b and the aircraft 100. In addition, the angles may be used in calculating a pose of the aircraft 100.

Accordingly, in various embodiments, the processing circuitry 303 (FIG. 3) may be employed to identify the first angle ($\Omega$) between the aircraft 100 and the first lenticular array 103 based at least in part on a first identifier (e.g., color, texture, or image) identified in at least one digital image captured of the first lenticular array 103a at the first known location 803. Similarly, the processing circuitry 303 may be employed to identify the second angle ($\theta$) between the aircraft 100 and the second lenticular array 103b based at least in part on a second identifier (e.g., color, texture, or image) identified in at least one digital image of the second lenticular array 103b at the second known location 806. The location of the aircraft 100 may be determined using the first angle ($\Omega$), the second angle ($\theta$), the first known location 803, and the second known location 806.

Figure 9:
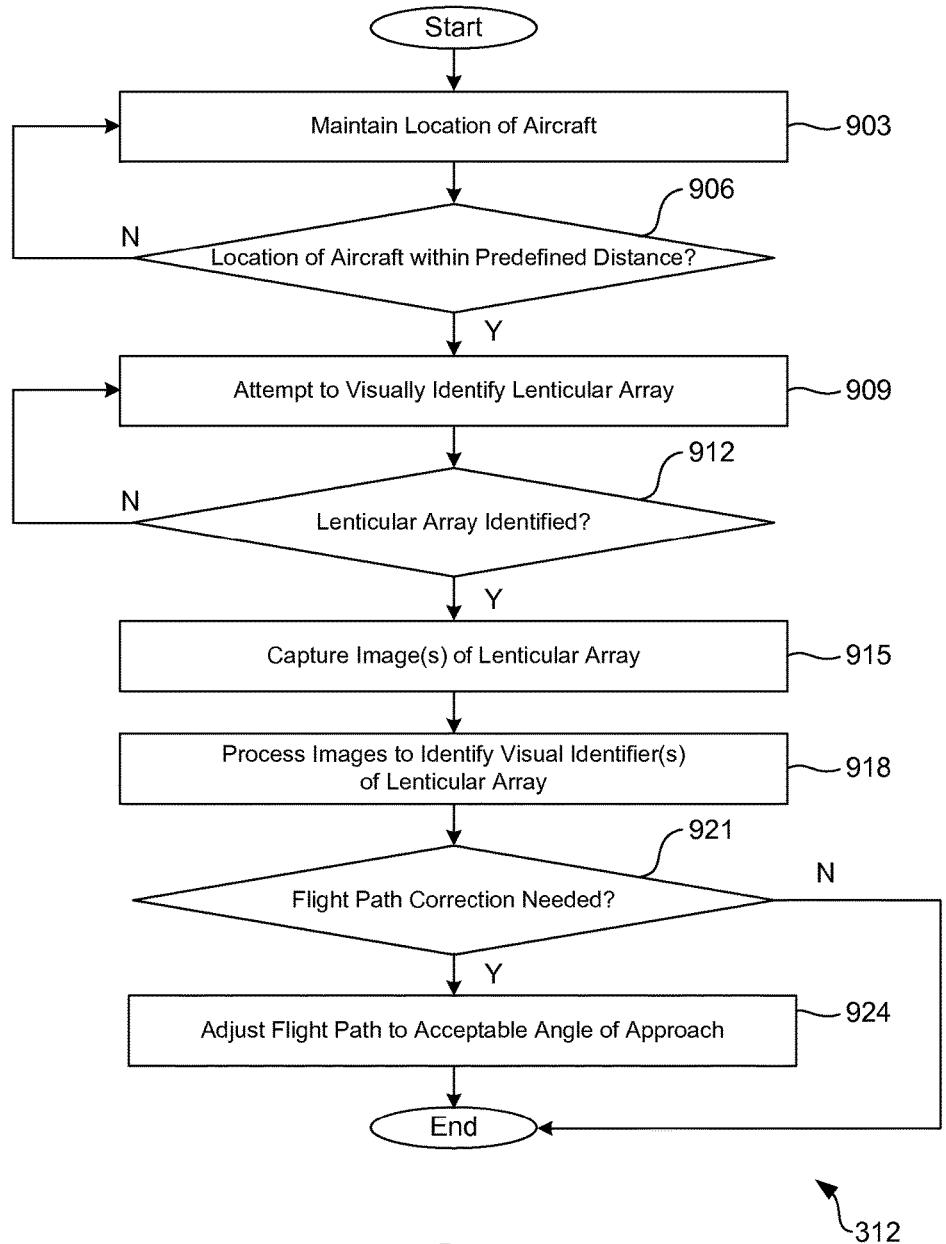
FIG. 9 is a flowchart illustrating one example of functionality implemented as portions of an aircraft control application executed in the aircraft of FIG. 1 or in a remote computing device according to various embodiments of the present disclosure.

Moving on to FIG. 9, shown is a flowchart that provides one example of the operation of a portion of the aircraft control application 312 according to various embodiments. It is understood that the flowchart of FIG. 9 provides merely an example of the many different types of functional arrangements that may be employed to implement the operation of the portion of the aircraft control application 312 as described herein. As an alternative, the flowchart of FIG. 9 may be viewed as depicting an example of elements of a method implemented in the aircraft 100 (FIG. 1) or in a remote computing device according to one or more embodiments.

Beginning with 903, the aircraft control application 312 may maintain a location of the aircraft 100. As noted above, an imaging device 109 (FIG. 1) may be employed to capture one or more digital images of a lenticular array 103 (FIG. 1) to adjust a flight path or to assist in a landing of the aircraft 100. As aircrafts 100 may travel great distances between lenticular arrays 103, it may be inefficient for resources of the aircraft 100 to continually search for lenticular arrays 103 using the imaging device 109 of the aircraft 100. Unnecessary processing may consume battery life or a fuel source. Accordingly, the aircraft control application 312 may maintain a GPS location, or other location, of the aircraft 100 such that, when the aircraft 100 is within a predefined distance of a lenticular array 103, the imaging device 109 may be employed to attempt to visually identify the lenticular array 103.

Hence, in 906, it is determined whether a location of the aircraft 100 is within a predefined distance of a lenticular array 103. In various embodiments, the predefined distance may include a range of the imaging device 109 in detecting one or more lenticular arrays 103. For example, if a certain type of imaging device 109 is capable of detecting a lenticular array 103 within one kilometer, the predefined distance may be configured at one kilometer. When the aircraft 100 is not within the predefined distance (e.g., the aircraft 100 is not within a kilometer of a lenticular array 103), the process may revert to 903 to continue maintaining a location of the aircraft 100.

In some embodiments, the lenticular array 103 may comprise circuitry configured to emit a signal (e.g., a Wi-Fi beacon), that, when detected by the processing circuitry 303 of the aircraft 100, is indicative that the aircraft 100 is within the predefined distance of the lenticular array 103. If the aircraft 100 is within the predefined distance of a lenticular array 103, the process may proceed to 909 where an attempt to visually identify the lenticular array 103 is made. In various embodiments, the aircraft control application 312 may employ the imaging device 109 to capture digital images of terrain and perform a visual analysis to determine whether a lenticular array 103, or another feature indicative of a location of the lenticular array 103, is detected in the terrain. In other embodiments, the aircraft control application 312 may determine whether a location of an aircraft 100 is within a predefined distance of a location of a lenticular array 103 by comparing a global positioning system (GPS) location of the aircraft 100 to a location of the lenticular array 103.

Thus, in 912, it is determined whether a lenticular array 103 has been identified in the digital images. To this end, digital images or video captured by the imaging device 109 may be processed using one or more visual processing algorithms to identify regions that may correspond to a lenticular array 103. As a non-limiting example, the lenticular array 103 may comprise a border 403 (FIG. 4) having a color that is distinguishable from the surrounding area or terrain. Using visual processing, the lenticular array 103 may be identified from the surrounding terrain based on the color of the border 403. If a lenticular array 103 has not been identified, the process may revert to 909 to make subsequent attempts to visually identify a lenticular array 103.

Assuming a lenticular array 103 has been identified, in 915, the aircraft control application 312 may capture one or more digital images of the lenticular array 103 using the imaging device 109. In 918, the digital images captured by the imaging device 109 may be processed by the aircraft control application 312 to identify one or more visual identifiers (e.g., colors, textures, and/or images) in the lenticular array 103. In order to identify the colors of the lenticular array 103, data files of the digital images may be processed, for example, to identify hexadecimal values of colors in the region of the digital image corresponding to the lenticular array 103.

The process then proceeds to 921 where it is determined whether a correction to a flight path of the aircraft 100 is needed. In various embodiments, the flight path is corrected in response to the aircraft 100 not having an acceptable angle of approach or locating in a position outside of an optimal flight corridor. Accordingly, in 924, if a correction to the flight path is needed, then the aircraft control application 312 may take a corrective action that adjusts a flight path of the aircraft 100 to an acceptable angle of approach or to fall within the optimal flight corridor.

As a non-limiting example, when the lenticular array 103 is viewed at a 14 degree angle by the imaging device 109 of the aircraft 100, the imaging device 109 may perceive a green color, or any other predefined color, from the lenticular array 103. Assuming the aircraft is noticeably above the 14 degree angle at, for example, 38 degrees, the imaging device 109 on the aircraft 100 may perceive a blue color from the lenticular array 103. Alternatively, assuming the aircraft 100 is noticeably below the 14 degree angle at, for example, 8 degrees, the imaging device 109 on the aircraft 100 may perceive a red color from the lenticular array 103. An identification of a hexadecimal value in a predefined range of red colors or in a predefined range of blue colors may indicate that the approach angle needs to be adjusted. Accordingly, the aircraft control application 312 may perform necessary remedial actions until a hexadecimal value in a predefined range of green color, indicative of the aircraft 100 being within an optimal flight corridor, is detected. As noted above, remedial actions may comprise adjusting a speed or rotation of one or more rotors 203 of the aircraft 100, adjusting a rate of descent of the aircraft 100, regulating power to an engine, tuning flaps or a rudder, or any other performable action that may correct the angle of approach.

Although the flowchart of FIG. 9 refers to green, blue, and red, the disclosure is not limited to these colors. For example, a multitude of colors, textures, or images may be used in the lenticular array 103 that are indicative of a corrective action needed to be performed by the aircraft 100 according to an ideal flight path. The predefined angle θ may be defined at any angle based on the terrain and/or the ideal flight path. Similarly, the disclosure is not limited to colors and, instead, may use textures and/or images in detecting and/or adjusting a flight path of the aircraft 100.

As described herein, the aircraft control application 312 may be configured to estimate an amount deviation of an aircraft 100 from a desired flight path based at least in part on a digital image of a lenticular array 103; determine whether the aircraft 100 is within a specified distance of the lenticular array 103, the lenticular array 103 indicating the desired flight path; and visually locate the lenticular array 103 using an imaging device 109 in response to the aircraft 100 being within the specified distance of the lenticular array 103. In some embodiments, the aircraft control application 312 may be configured to use a global positioning system (GPS), or other positioning system, to determine whether the aircraft 100 is within a specified distance of a first lenticular array 103a and a second lenticular array 103b located proximate a destination, wherein the first lenticular array 103a and the second lenticular array 103b define a flight corridor associated with the destination. The aircraft control application 312 may use an imaging device 109 in response to a determination that the aircraft 100 is within the specified distance, to locate the first lenticular array 103a and the second lenticular array 103b. A position of the aircraft 100 relative to the flight corridor based at least in part on identifiers (e.g., colors, textures, or images) identified in at least one digital image captured by the imaging device 109 of the first lenticular array 103a and the second lenticular array 103b. The aircraft 100 may be controlled to follow a flight path within the flight corridor based at least in part on the estimated position.

Figure 10:
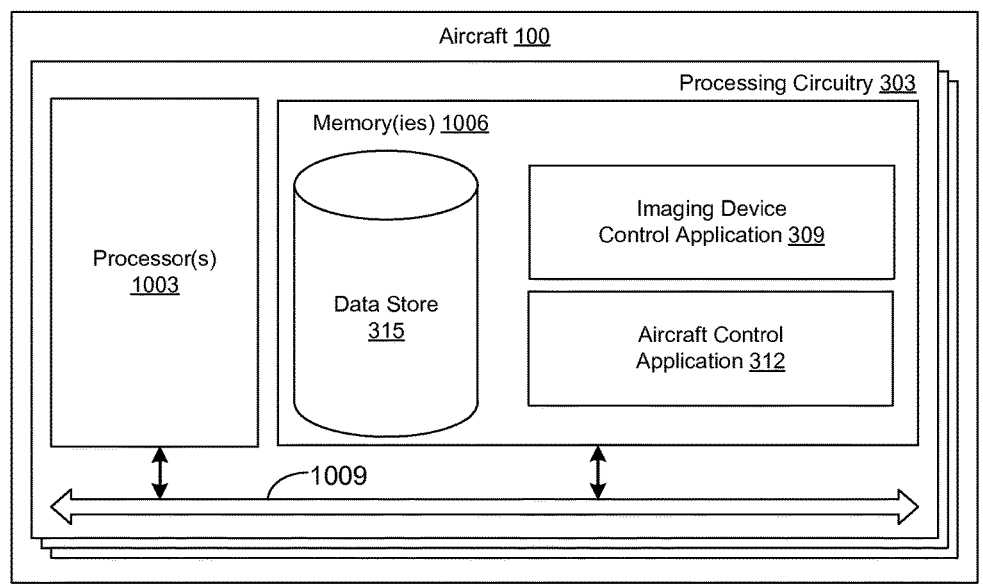
FIG. 10 is a schematic block diagram that provides one example illustration of the components of the aircraft of FIG. 1 according to various embodiments of the present disclosure.

With reference to FIG. 10, shown is a schematic block diagram of a portion of the components of the aircraft 100 according to an embodiment of the present disclosure. The aircraft 100 includes processing circuitry 303 which may include at least one processor circuit, for example, having a processor 1003 and a memory 1006, both of which are coupled to a local interface 1009. To this end, the processing circuitry may comprise, for example, a computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the imaging device control application 309, the aircraft control application 312, and potentially other applications. Also stored in the memory 1006 may be a data store 315 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the imaging device control application 309, the aircraft control application 312, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 9 shows the functionality and operation of an implementation of portions of the imaging device control application 309 and/or the aircraft control application 312. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the imaging device control application 309 and the aircraft control application 312, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the imaging device control application 309 and the aircraft control application 312, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or processing circuitry 303, or in multiple computing devices in the same computing environment. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An aircraft comprising processing circuitry, wherein the processing circuitry is configured to perform a landing of the aircraft by:
    identifying, using a global positioning system (GPS), that the aircraft is within a predetermined distance of a first lenticular array and a second lenticular array located proximate a destination, wherein the first lenticular array and the second lenticular array define a flight corridor associated with the destination;
    capturing at least one image of an environment using an imaging device of the aircraft in response to the aircraft being within the predetermined distance;
    programmatically locating the first lenticular array and the second lenticular array in the at least one image;
    applying at least one signal processing filter to the at least one image;
    identifying that a first color from the first lenticular array located in the at least one image is within a first color error threshold;
    identifying that a second color from the second lenticular array located in the at least one image is within a second color error threshold;
    generating an estimated position of the aircraft relative to the flight corridor based at least in part on the first color identified in the first lenticular array and the second color identified in the second lenticular array; and
    control the aircraft to follow a flight path within the flight corridor based at least in part on the estimated position.

2. The aircraft of claim 1, wherein performing the landing further comprises:
    identifying a first angle between the aircraft and the first lenticular array based at least in part on the first color identified in the at least one image;
    identifying a second angle between the aircraft and the second lenticular array based at least in part on the second color identified in the at least one image; and
    estimating the position of the aircraft using the first angle, the second angle, and a known location of the first lenticular array and the second lenticular array.

3. The aircraft of claim 1, wherein the flight corridor defines a trajectory to a landing site associated with a materials handling facility.

4. The aircraft of claim 1, wherein:
    the first lenticular array is one of a first plurality of lenticular arrays in a first lenticular array collection;
    the second lenticular array is one of a second plurality of lenticular arrays in a second lenticular array collection; and
    the first lenticular array collection and the second lenticular array collection are positioned at separate locations.

5. A system, comprising:
    at least one computing device; and
    program instructions executable in the at least one computing device that, when executed by the at least one computing device, cause the at least one computing device to:
        apply at least one signal processing filter to a digital image of a lenticular array;
        identify that a color of the lenticular array in the digital image is within a color error threshold;
        estimate an amount of deviation of an aircraft from a desired flight path based at least in part on the color of the lenticular array identified from the digital image; and
        control a flight of the aircraft based at least in part on the amount of deviation estimated.

6. The system of claim 5, further comprising program instructions that, when executed by the at least one computing device, cause the at least one computing device to:
    determine that the aircraft is within a specified distance of the lenticular array; and
    attempt to visually identify the lenticular array in an environment using an imaging device in response to the aircraft being within the specified distance of the lenticular array.

7. The system of claim 5, wherein the at least one computing device is at least a portion of a positioning system module onboard the aircraft.

8. The system of claim 5, further comprising program instructions that, when executed by the at least one computing device, cause the at least one computing device to adjust at least one of a pitch, a roll, or a yaw of the aircraft to reduce the amount of deviation estimated.

9. The system of claim 5, wherein a type of the aircraft is selected from a group consisting of a land-based aircraft, a seaplane, an amphibian aircraft, a helicopter, a dirigible, a gyrocopter, a tilt-wing aircraft, a glider, and a sailplane.

10. The system of claim 5, wherein a type of the aircraft is a multi-rotor helicopter; and
    further comprising program instructions that, when executed by the at least one computing device, cause the at least one computing device to adjust a speed of rotation of at least one rotor of the multi-rotor helicopter to reduce the amount of deviation estimated.

11. The system of claim 5, wherein:
    the lenticular array is one of a first plurality of lenticular arrays in a first lenticular array collection;
    the system further comprises a second lenticular array being one of a second plurality of lenticular arrays in a second lenticular array collection; and
    the first lenticular array collection and the second lenticular array collection are positioned at separate locations.

12. A method, comprising:
    accessing, by at least one computing device comprising at least one hardware processor, a digital image of a lenticular array captured by an imaging device onboard an aircraft, the lenticular array comprising a color gradient;
    applying, by the at least one computing device, at least one signal processing filter to the digital image of the lenticular array;
    in response to the at least one signal processing filter being applied to the digital image, determining, by the at least one computing device, that a color of the lenticular array in the digital image is within a color error threshold;
    estimating, by the at least one computing device, a position of the aircraft relative to a specified flight path based at least in part on the color of the lenticular array; and
    controlling, by the at least one computing device, a trajectory of the aircraft to follow the specified flight path based at least in part on the color determined to be within the color error threshold.

13. The method of claim 12, further comprising:
determining, by the at least one computing device, that the aircraft is within a predefined distance of the lenticular array; and
attempting, by the at least one computing device, to visually locate the lenticular array using an imaging device in response to a determination that the aircraft is within the predefined distance of the lenticular array.

14. The method of claim 13, wherein determining, by the at least one computing device, that the aircraft is within the predefined distance of the lenticular array comprises comparing, by the at least one computing device, a positioning system location of the aircraft to a known location of the lenticular array.

15. The method of claim 12, wherein a type of the aircraft is selected from a group consisting of a land-based aircraft, a seaplane, an amphibian aircraft, a helicopter, a dirigible, a gyrocopter, a tilt-wing aircraft, a glider, and a sailplane.

16. The method of claim 12, wherein a type of the aircraft is a multi-rotor helicopter.

17. The method of claim 12, wherein the lenticular array further comprises an arrangement of a plurality of lenticular arrays.

18. The method of claim 12, wherein the specified flight path is used in a landing of the aircraft at a predefined landing site.

19. The method of claim 12, wherein the lenticular array further comprises a wavelength gradient of electromagnetic waves.

20. The method of claim 12, wherein the at least one computing device is at least a portion of a positioning system module onboard the aircraft.

* * * * *